United States Patent [19]

Ostoja-Starzewski

[11] Patent Number: 5,073,014

[45] Date of Patent: Dec. 17, 1991

[54] HIGHLY EFFECTIVE POLARIZERS

[75] Inventor: Karl-Heinz A. Ostoja-Starzewski, Leverkusen, Fed. Rep. of Germany

[73] Assignee: Bayer Aktiengesellschaft, Leverkusen, Fed. Rep. of Germany

[21] Appl. No.: 475,041

[22] Filed: Feb. 5, 1990

[30] Foreign Application Priority Data

Feb. 23, 1989 [DE] Fed. Rep. of Germany ....... 3905519

[51] Int. Cl.$^5$ .......................... G02B 5/30; B29D 11/00
[52] U.S. Cl. .................................... 359/490; 252/585; 264/1.3
[58] Field of Search ................ 350/397, 398; 252/585; 264/1.3

[56] References Cited

U.S. PATENT DOCUMENTS 4,893,911 1/1990 Ostoja-Starzewski et al. .... 350/398

OTHER PUBLICATIONS

*Chemie und Technologie Der Kunststoffe*, Band II, Herstellungsmethoden und Eigenschaften, E. Trommsdorff, "Kunstoffe aus Polymersaten von Athylenderivaten," pp. 20–23, Leipzig, 1956, R. Houwink, ed.

*Primary Examiner*—Bruce Y. Arnold
*Assistant Examiner*—Martin Lerner
*Attorney, Agent, or Firm*—Sprung Horn Kramer & Woods

[57] ABSTRACT

Highly effective polarizers are described having a degree of polarization P of at least 95% and a dichroic ratio $Q_E$=quotient of the extinction in the blocked position to the extinction in the transmission position, over almost the entire wavelength range of visible light, between 400 and 800 nm, of 10 or greater, the said polarizers comprising polyacetylene-containing polymer products with a matrix of pure polyvinyl alcohol (PVA). They are used in the form of films with a stretch ratio $$\epsilon = \frac{l - l_o}{l_o} \times 100$$

(l=length after stretching, l$_o$=length prior to stretching) of more than 300%. They can be prepared by polymerizing acetylene in a solution of pure PVA in the presence of a nickel catalyst.

16 Claims, No Drawings

HIGHLY EFFECTIVE POLARIZERS

BACKGROUND OF THE INVENTION

1. Field of the Invention

The invention relates to highly effective polarizers made from polyacetylene-containing polymer products with a matrix of pure polyvinyl alcohol (PVA), which have a high dichoric ratio $Q_E$ and at the same time a very high degree of polarization P. Polarizers of this type are used as film.

2. Description of the Related Art

The preparation of polarizing films based on polyvinyl alcohol and iodine has been disclosed for example in DD 210,342. In this procedure, a polyvinyl alcohol film is subsequently coloured. In order to obtain any satisfactory results at all, complex processes of preparation and posttreatment are required. Moreover, as a rule only part of the film obtained in this manner is usable. The preparation of polarizing films of this type is limited in practice to iodine and additionally only to a few substances which are highly effective by virtue of dichroism.

The disadvantage with iodine-doped films is that the aggressive iodine migrates from the film; the disadvantage with films doped with dichroic substances is that they are coloured and can only be used for a narrow wavelength range.

Improved polarizers based on polyacetylene incorporated in polymer matrices have furthermore been disclosed in EP 249,019. Films obtained therefrom already have a high optical quality. For instance after the polymerization of acetylene in a solution of polyvinyl alcohol in DMF, a polarizing film is obtained which after 4-fold stretching has a light-polarizing efficiency of more than 90%.

However, for "high-tech" applications, these films which have been disclosed in the cited EP Application still do not have a sufficiently high dichroic ratio, which is defined as the quotient $Q_E$ of the extinction in the blocked position to the extinction in the transmission position for plane-polarized light. The film mentioned in the exemplary embodiment of the cited EP Application is reddish-brown in colour.

SUMMARY OF THE INVENTION

Highly effective polarizers have now been found which are made from polyacetylene-containing polymer products and have a matrix of pure polyvinyl alcohol (PVA) and a maximum degree of polarization P of at least 95% and a dichroic ratio $Q_E$ over almost the entire wavelength range of visible light, from 400 to 800 nm, of $Q_E$=quotient of the extinction in the blocked position to the extinction in the transmission position = 10 or greater in the form of stretched films.

The polarizing effect extends into the near IR and UV regions.

DETAILED DESCRIPTION OF THE INVENTION

Polarizers of this type are used as films in which a preferred direction is produced by stretching. It has furthermore been found that the high efficiency of polarizers according to the invention can be improved at higher stretch ratios. The polarizers according to the invention have a stretch ratio $\epsilon$ of more than 300%, preferably at least 500%, particularly preferably at least 600%. The stretch ratio $\epsilon$ is defined here by the quotient $$\epsilon = \frac{l - l_o}{l_o} \times 100$$

where l is the length after stretching and $l_o$ is the length prior to stretching.

The highly effective polarizers according to the invention have, in addition to the aforementioned dichroic ratio $Q_E$= 10 or greater, a high maximum degree of polarization P of at least 95%, preferably at least 98%, particularly preferably at least 99%. In many cases degrees of polarization of 99.5 and above are obtained. The maximum values of $Q_E$ reach values of 15 and above, preferably 20 and above. In many cases maximum $Q_E$ values of above 30, even above 40 are reached.

The degree of polarization P is given here by the relationship between the transmission of plane-polarized light in the transmission position and in the blocked position (transmiss. trans. and blocked):

$$P = \frac{\text{transmiss. trans.} - \text{transmiss. blocked}}{\text{transmiss. trans.} + \text{transmiss. blocked}} \times 100$$

The dichroic ratio $Q_E$ is defined as the quotient of the extinction in the blocked position to the extinction in the transmission position. This ratio is valid for a certain wavelength and in the case of suitable dichroic dyes is limited to a narrow wavelength range of visible light. This can be seen from the inherent colour of polarizers which have been prepared with the aid of dichroic dyes; the aforesaid substances are moreover difficult to distribute uniformly over the relatively large surface of a film which is to be coloured with them.

In contrast, the polarizers according to the invention have a high $Q_E$ value over almost the entire range of visible light and are therefore substantially neutral in colour, which can be seen from their inherent grey colour. This meets the requirement of having neutral-coloured polarizers available with a high light/dark contrast. This is important for optical telecommunications devices such as LCDs with an external or internal polarizing film, in which high resolution and good legibility are sought.

The highly effective polarizers according to the invention can be prepared by polymerizing acetylene in the solution of a pure PVA in the presence of a nickel catalyst which is obtained by reacting a nickel(0) compound or a compound which can be converted in situ into a nickel(0) compound with phosphorus compounds of the formulae

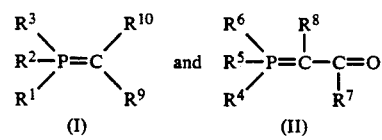

in which
R¹, R² and R³ independently of one another denote $C_1$-$C_{20}$-alkyl, $C_1$-$C_{20}$-alkoxy, $C_3$-$C_8$-cycloalkyl, $C_2$-$C_{20}$-alkenyl, di-$C_1$-$C_4$-alkylamino, $C_6$-$C_{12}$-aryl, $C_6$-$C_{12}$-aryloxy or $C_7$-$C_{15}$-aralkyl,
denotes $C_6$-$C_{12}$-aryl, $R^5$, $R^6$, $R^7$ and $R^8$ independently of one represent $C_1$–$C_{20}$-alkyl, $C_1$–$C_{20}$-alkoxy, $C_2$–$C_{20}$-alkenyl, $C_3$–$C_8$-cycloalkyl, $C_6$–$C_{12}$-aryl or $C_6$–$C_{12}$-aryloxy and additionally $R^7$ can denote hydrogen, $R^8$ can denote hydrogen or acyl and $R^9$ and $R^{10}$ independently of one another can denote hydrogen, silyl, acyl, nitrophenyl, cyano or $R^1$, or in the presence of nickel catalysts which can be prepared by reacting a nickel(O) compound or a compound which can be converted in situ into a nickel(O) compound with an adduct or a mixture of a quinonoid compound and a phosphine of the formula $$R^5-P\begin{matrix}R^6\\ \\R^4\end{matrix}, \quad \text{(III)}$$

which $R^4$, $R^5$ and $R^6$ have the above meaning, and of a compound of the formula (I).

Preference is given to the use of nickel catalysts which are obtained by reacting a nickel(O) compound or a compound which can be converted in situ into a nickel(O) compound with phosphorus compounds of the formulae

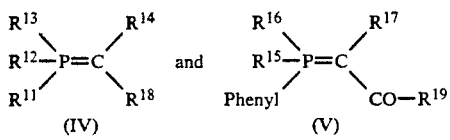

(IV) and (V)

in which $R^{11}$, $R^{12}$ and $R^{13}$ independently of one another denote $C_1$–$C_8$-alkyl, phenyl or benzyl, $R^{14}$ represents hydrogen, $C_1$–$C_8$-alkyl or phenyl, $R^{15}$, $R^{16}$ and $R^{17}$ independently of one another denote $C_1$–$C_8$-alkyl or phenyl, and $R^{17}$ may additionally denote hydrogen or acyl, $R^{18}$ denotes hydrogen or phenyl and $R^{19}$ represents phenyl or $C_1$–$C_4$-alkyl, or to the use of nickel catalysts which can be prepared by reacting a nickel(O) compound or a compound which can be converted in situ into a nickel(O) compound with an adduct or a mixture of benzoquinone and a phosphine of the formula $$R^{15}-P\begin{matrix}R^{16}\\ \\ \text{Phenyl}\end{matrix}, \quad \text{(VI)}$$

in which $R^{15}$ and $R^{16}$ have the above meaning, and of a compound of the formula (IV).

Particular preference is given to the polymerization of the acetylene in the presence of nickel catalysts which can be prepared by reacting a nickel(O) compound or a compound which can be converted in situ into a nickel (O) compound with compounds of the formulae

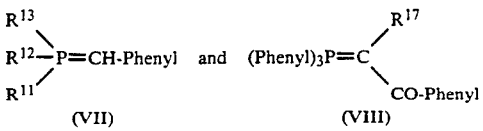

(VII) and (VIII)

in which $R^{11}$, $R^{12}$, $R^{13}$ and $R^{17}$ have the meaning given above, or in the presence of nickel catalysts which can be prepared by reacting a nickel(O) compound or a compound which can be converted in situ into a nickel(O) compound with an adduct or a mixture of benzoquinone and triphenylphosphine and of a compound of the formula (VII).

In order to prepare the catalyst, 1–4 moles of the compound of the formula (I) or (IV) or (VII) and 1–4 moles of the compound of the formula (II) or (V) or (VIII) are used per mole of the nickel(O) compound, preferably about 1 mole of the compound of the formula (I) or (IV) or (VII) and about 1 mole of the compound of the formula (II) or (V) or (VIII) are used per mole of nickel(O) compound. Equal molar ratios apply if instead of a compound of the formula (II) or (V) or (VIII) a quinone/phosphine adduct or quinone/phosphine mixture of the type described is used.

The preparation of the catalyst is carried out at a temperature of 0° to 100° C., preferably 20° to 70° C. The preparation is carried out with the exclusion of oxygen, preferably in a solvent which must be inert with respect to the reactants, such as benzene, toluene, cyclohexane or n-hexane. After preparation of the catalyst, it is usually isolated as a solid by filtration, the solution being previously concentrated and/or cooled as required. The catalyst can however also be used directly without being isolated, i.e. as a solution, for the polymerization of acetylene.

The nickel(O) compounds may for example be Ni(cyclooctadiene)$_2$ and Ni(allyl)$_2$. Nickel compounds which can be converted in situ into nickel(O) compounds are for example: Ni acetylacetonate, Ni octanoate and Ni stearate, which can be reduced with the aid of customary reducing agents such as borohydride, alanate, aluminium alkyls or lithium organyles.

Examples of alkyl, preferably $C_1$–$C_8$-alkyl, which can be straight-chain or branched are: methyl, ethyl, propyl, isopropyl, butyl, isobutyl, tert-butyl, and the isomeric amyls, hexyls, octyls, decyls, dodecyls, hexadecyls and eicosyls. Particular preference is given to alkyl with 1–4 carbon atoms.

Examples of $C_1$–$C_{20}$-alkoxy which can be straight-chain or branched are: methoxy, ethoxy, propoxy, isopropoxy, butoxy, isobutoxy, tert-butoxy, and the isomeric amyloxy, hexyloxy, octyloxy, decyloxy, dodecyloxy and eicosyloxy. Preference is given to alkoxy with 1–8 carbon atoms, and particular preference to alkoxy with 1–4 carbon atoms.

Examples of $C_3$–$C_8$-cycloalkyl are: cyclopropyl, cyclobutyl, cyclopentyl, cyclohexyl, methylcyclopentyl, methylcyclohexyl, cycloheptyl and cyclooctyl.

Examples of $C_6$–$C_{12}$-aryl are: phenyl, naphthyl and biphenylyl. The preferred aryl is phenyl.

Examples of $C_2$–$C_{20}$-alkenyl are: vinyl, propenyl, allyl, butenyl, pentenyl, hexenyl, octenyl, decenyl or eicosenyl and also the branched isomers thereof.

Examples of $C_6$-$C_{12}$-aryloxy are: phenoxy, naphthyloxy and biphenyloxy. Preference is given to phenoxy.

Examples of $C_7$-$C_{15}$-aralkyl are: benzyl, phenylethyl, phenylpropyl and naphthylmethyl, preferably benzyl.

Examples of di($C_1$-$C_4$alkyl)amino are: dimethylamino, diethylamino, dipropylamino, methylbutylamino, ethylbutylamino and so on.

Examples of silyl are tri-$C_1$-$C_4$-alkylsilyl, triphenylsilyl or mixed trisubstituted alkylphenylsilyls, preferably tri-$C_1$-$C_4$-alkylsilyls, such as trimethylsilyl, triethylsilyl and so on.

Examples of acyl are $C_1$-$C_8$-alkylcarbonyl or $C_6$-$C_{12}$-arylcarbonyl which can be substituted in the manner described below, such as acetyl, propionyl, butyryl, $C_5$-alkylcarbonyl, $C_8$-alkylcarbonyl, benzoyl, substituted benzoyl or naphthylcarbonyl. Preference is given to acyl which is substituted or unsubstituted $C_1$-$C_4$-alkylcarbonyl or benzoyl. Particular preference is given to acetyl or benzoyl.

The substituents mentioned can be from singly to triply, preferably singly or doubly, particularly preferably singly substituted by $C_1$-$C_4$-alkyl, by $C_1$-$C_4$-alkoxy, by $C_6$-$C_{12}$-aryl, by $C_6$-$C_{12}$-aryloxy or nitro, preferably by $C_1$-$C_4$-alkyl, by $C_1$-$C_4$-alkoxy, by phenyl or phenoxy, and in the case of multiple substitution the substituents can be variously selected from the list given.

Suitable quinonoid compounds are o- or p-quinonoid compounds of the benzene series and naphthalene series and also anthraquinones, which can be further substituted in the manner described above. Examples are p-benzoquinone, 1,4-naphthoquinone and 9,10-anthraquinone.

Preferred radicals $R^1$, $R^2$ and $R^3$ are $C_1$-$C_6$-alkyl, cyclohexyl, phenyl, tolyl, benzyl, di-$C_1$-$C_4$-alkylamino, phenoxy and $C_1$-$C_4$-alkoxy.

$R^4$ is preferably phenyl.

$R^5$, $R^6$, $R^7$ and $R^8$ are preferably cyclohexyl, phenyl, tolyl, benzyl, vinyl and $C_1$-$C_4$-alkyl.

$R^7$ is furthermore preferably hydrogen or $C_1$-$C_4$-alkoxy, and $R^8$ is furthermore preferably hydrogen, acetyl or benzoyl.

$R^9$ and $R^{10}$ are preferably hydrogen, $C_1$-$C_6$-alkyl, phenyl, $C_1$-$C_6$-alkenyl and phenyl-$C_2$-$C_6$-alkenyl.

The amount of nickel catalyst used in the acetylene polymerization is not critical. Typical catalyst concentrations are $10^{-1}$ to $10^{-5}$, preferably $10^{-2}$-$10^{-4}$, particularly preferably $0.5 \times 10^{-3}$ to $5 \times 10^{-3}$ moles of nickel catalyst per litre of polymerization ingredients.

The polymerization of the acetylene can be carried out either as a continuous process or as a batch process. A temperature of 20°-120° C., preferably 20° to 100° C., particularly preferably 20°-80° C. is maintained during this polymerization.

The polymerization can be carried out at normal pressure but it is also possible to polymerize at elevated pressure optionally with an inert gas such as $N_2$ as a mixture component, for example at 1.01 to 20 bar. The acetylene can be taken without further purification from a pressure bottle and used. With acetone-sensitive catalysts it can be necessary to freeze out any acetone contained in the acetylene beforehand in a cold trap.

The acetylene polymerization is carried out in a solution of pure polyvinyl alcohol (PVA). Pure PVA is understood to mean one in which more than 90 up to 100%, preferably 95-100% of all (co)monomers of the polymers are vinyl alcohol units. The balance of the monomer units making up 100% comprises monomer units such as ethylene, vinyl acetate, vinyl trifluoroacetate and other comonomer units known in copolymers of this type. These copolymers may comprise predominantly tactic or atactic polymers. The pure PVA to be used according to the invention may for example be prepared by copolymerizing more than 90 up to 100% of vinyl acetate units with less than 10 down to 0 ethylene units and completely hydrolysing all vinyl acetate units. Polymerization of vinyl acetate or vinyl trifluoroacetate and hydrolysis of more than 90 up to 100% of all ester groups may also be used to prepare the said PVA. PVA is prepared industrially by hydrolysing polyvinyl acetate to the desired degree.

Suitable solvents for PVA are cyclic, N-alkyl-substituted carboxamides (lactams) or cyclic, N,N,dialkyl-substituted ureas. These cyclic compounds have 5-7 membered rings. Suitable alkyl substituents are $C_1$-$C_4$-alkyl groups, preferably methyl or ethyl, particularly preferably methyl. Examples of solvents of this type are N-methylpyrrolidone (NMP), N-ethylpyrrolidone, N-propylpyrrolidone, N-butylpyrrolidone, N-methylpiperidin-2-one, N-methylcaprolactam(NMC), N,N'-dimethylimidazolin-2-one, N,N'-trimethylene-N,N'-dimethylurea, N,N'-tetramethylene-N,N'-dimethylurea and so on. Solvents of this type can be used individually or as a mixture of several such solvents. Preference is given to the use of NMP.

The above solvents can moreover be replaced to the extent of 0.1 to 50% by weight by other solvents such as dimethylformamide (DMF), diethylformamide, dimethylsulphoxide (DMSO) and so on. Furthermore, solvents of this type or mixtures thereof can contain water in a percentage range for example of 0.001 to 5% by weight without the catalyst being deactivated. The $H_2O$ content is preferably however as low as possible and particularly preferably approaches the value zero.

The preparation of the highly effective polarizers according to the invention employs acetylene polymerization with a reaction time of 5-1000 sec., preferably 5-600 sec.

The properties of the polyacetylene-containing polymer product are consistent with a structural model in which polyacetylene side branches are grafted onto the polymer matrix.

The polarizers according to the invention are prepared in the form of films by casting or extrusion, the films then being stretched. For the purpose of casting, it is also possible to blend polyacetylene-containing polymer solutions with non-polyacetylene-containing starting polymer solutions or with other polyacetylene-containing polymer solutions.

The polarizing film can for example be obtained by stretching a coagulated film. In this procedure, after the casting operation, the solvent is not removed by evaporation (at room temperature or elevated temperature and/or reduced pressure) but by contact with a coagulating agent into which the solvent from the polymerization (casting) solution migrates, following which only the generally more volatile coagulating agent has to be evaporated.

Examples of coagulating agents are toluene, cyclohexane, acetone, methanol, ethanol and others in which PVA is insoluble.

The polyacetylene-containing polymer product can however also be coagulated from the polymerization solution using one of the above coagulating agents and isolated in the customary manner as a solid.

The solid poly.acetylene-containing polymer product is again soluble in one of the solvents mentioned for the polymerization or in water and can be cast from a solution of this type into films.

It can be desirable to add a plasticizer known to those skilled in the art to the casting solution. Customary and suitable plasticizers which can be used are for example glycerol or ethylene glycol in customary amounts such as about 1–50%, relative to PVA. Additives of this type are particularly advantageous if the coagulated polyacetylene-containing polymer product is processed from an aqueous casting solution.

The maximum $Q_E$ values given above may occur in various ranges of the visible spectrum depending on polymerization parameters such as time, temperature, catalyst composition and so on, but in particular on the catalyst composition. It may be desirable, then, to broaden the range of the maximum $Q_E$ value by using more than one catalyst of the type described above for the polymerization and by so doing to produce several $Q_E$ maxima. An effect which is in principle the same is achieved by blending polymer solutions or coagulated polymers which have been prepared using various catalysts or under various polymerization conditions.

The polarizers according to the invention can be processed into laminates by single-sided or double-sided application of adhesive layers which can bear outer layers, and in this form the said polarizers can be protected from mechanical and chemical damage. The degree of order in a stretched polarizing film is not disturbed by lamination. The invention therefore relates also to this specific embodiment of the polarizers described.

While, in the case of many laminates, mechanical properties such as strength, energy absorption (safety glasses) and generally an adequate adhesion of the laminate components are of prime importance, with the lamination of the highly effective polarizers according to the invention there are additional requirements, namely
(1) high light transmission through complete elimination of fogging,
(2) a high degree of light fastness
(3) protection of the polarizing core layer from outside chemical effects and
(4) compatibility of the adhesive layers and optionally of the outer layers with the polarizing core layer without impairment of the optical properties.

Suitable outer layers are for example aromatic polyesters, polyacrylonitriles, poly(meth)acrylates, polysulphones, aromatic polycarbonates, cellulose acetates, cellulose acetobutyrates, polyamides, polyhydantoins, polyimides, polyamide-imides, polyparaphenylenebenzo-bis-imidazoles and polyparaphenylenebenzo-bis-oxazoles, polyether ketones and mineral glasses, preference being given in particular to the use of polyesters, polyacrylates, polycarbonates, cellulose esters and mineral glasses. The transparency of these materials is their most important feature. They are generally used as thin sheets or as films.

Suitable adhesive layers are thin layers of bondable materials which do not impair the optical properties of the total laminate and which are suitable for joining the core layer and the outer layers with adequate adhesion and which furthermore do not cause any undesired change in the outer layers and in the polarizing core layer, in particular in the polarizing core layer. Solvent-free or solvent-containing systems are suitable for this purpose. The solvent-containing systems are in particular subject to the important requirement that no chemical changes must be caused within the outer layers and the polarizing core layer.

Examples of adhesive materials of this type, which are essentially known to those skilled in the art, are: epoxy resins which cure in the presence of amines, acid anhydrides or polyamides; acrylate systems which may be monomeric and oligomeric systems with vinyl groups and which can be cured after application of the outer layer by thermal, free-radical or photochemical means; mixtures of polyacrylates with phenolic resins which can be applied in solution; isocyanate adhesives and polyurethanes.

The adhesive materials which are to be used as adhesive layers can for example be applied by casting a solution of this adhesive material onto the polarizing core layer and evaporating the solvent. The polarizing core layer which has been provided with adhesive layers on one or both sides in this manner can then be joined to the outer layers.

It is also possible to carry out the operation the other way round and initially apply adhesive material to the outer layer(s) and subsequently again join the outer layers provided with adhesive layers to the polarizing core layer. The thickness of the individual layers can be set within extraordinarily wide limits and is not essential to the invention. Examples of the thicknesses of adhesive layers are from 0.5 to 50 $\mu$m, preferably to 20 $\mu$m and for the outer layers, thicknesses of 5 $\mu$m to 1 mm, preferably 5 to 100 $\mu$m. Outer layers may however also be optical lenses or prisms with relatively high thicknesses. The core layer may be 1 to 100 $\mu$m thick, preferably 5 to 50 $\mu$m thick.

The polarizing film according to the invention and indeed also the adhesive or outer layers can moreover be stabilized with stabilizers known to those skilled in the art, such as UV absorbers, HALS types and radical interceptors against UV light, chemical or thermal degradation; examples of typical stabilizers for this purpose are Ionol ® and Bayer UV 340 ® which may however be replaced or supplemented by many other stabilizers. No reduction of the optical quality of the polarizing film takes place here.

EXAMPLE 1

Catalyst preparation 36 mmol of bis-cyclooctadienenicel(O) in 250 ml of dry toluene saturated with argon were mixed under an argon atmosphere with 36 mmol of 4-hydroxy-6-(triphenylphosphoranylidene)cyclohexa-2,4-dien-1-one and 36 mmol of triisopropylphosphinebenzylidene. The mixture was heated at 60° C. for about 1 h with vigorous stirring. The dark brown reaction mixture was concentrated in vacuo to dryness. The crude catalyst obtained in this way was dissolved at 60° C. in dimethylformamide (DMF) and then precipitated using toluene/hexane, the supernatant separated off and the residue dried in vacuo.

EXAMPLE 2

Polyvinyl alcohol-polyacetylene (PVA-PAC)

5 g of polyvinyl alcohol (PVA; degree of hydrolysis of the polyvinyl acetate 99%) were dissolved in 95 g of dry NMP (degassed, saturated with argon) at about 120° C. under an inert gas atmosphere in a 250 ml reaction flask (gas inlet, stirrer, internal thermometer, bubble counter) and then brought to a controlled temperature of 40° C. Then 0.2 mmol of the catalyst described above dissolved in 2 ml of NMP were admixed under an argon atmosphere and a uniform stream of acetylene gas which had been passed through a cold trap cooled with dry ice/acetone was introduced for a period of 30 seconds into the PVA-NMP catalyst mixture.

The resulting blue PVA-PAC solution (absorption maximum 610 nm) was coagulated in 500 ml of acetone, washed with acetone and dried at room temperature under high vacuum. The solid was dissolved in water at about 90° C. over a period of 1 h to form an 8% strength solution and 0.5 g of glycerol was added per 100 ml of solution. The likewise blue aqueous solution was filtered through a polyamide cloth with a mesh size of 100 μm and applied to a grease-free glass sheet, using a doctor blade, as a layer 500 μm in thickness. After evaporation of the water a dark blue film was obtained which was removed from the substrate and stretched at about 145° C. to $\epsilon = 700\%$.

The stretched highly transparent light grey film had a degree of polarization at 600 nm of 99.7%.

| | |
|---|---|
| $Q_E$ max | 35.6 |
| $Q_E \geq 20$ at | 500–770 nm |
| $Q_E \geq 10$ at | 430–800 nm |
| $P \geq 99\%$ at | 475–730 nm |
| $P \geq 95\%$ at | 440–745 nm |

The above optometric data were determined routinely with the aid of a spectrophotometer of the type Uvikon 810 P supplied by Kontron. In order to be able to determine substantially the excellent extinction characteristics of the polarizing films according to the invention in the blocked position even for high extinctions within the range from 3 to about 5.7 (which are above the measuring range of the Uvikon 810 P) some subsequent measurements were made using a spectrophotometer type PM Q II supplied by Zeiss and the peak values of P and $Q_E$ found were still higher than in the routine measurement.

This subsequent measurement produced the following optometric data:

| | |
|---|---|
| P | 100% at 600 nm |
| $Q_E$ max | 43.8 |
| $Q_E \geq 20$ at | 490–770 nm |
| $Q_E \geq 10$ at | 430–800 nm |
| $P \geq 99\%$ at | 470–720 nm |
| $P \geq 95\%$ at | 440–745 nm |

EXAMPLES 3 and 4

Polarizing films were prepared analogously to Example 2 and their conditions of preparation and properties are compiled in the following table.

| Example No. | Catalyst | Amount of catalyst per 5 g of PVA (mmol) | PVA concentration in NMP (%) | Polymerization Temp. °C. | Polymerization Time sec. |
|---|---|---|---|---|---|
| 3 | NiPh(Ph₂PCHCMeO)(Pr₃ⁱPCHPh) | 0.2 | 5 | 30° | 30 |
| 4 | NiPh(Ph₂PCHCPhO)(Ph₃PCH₂) | 0.2 | 5 | 40° | 30 |

Me = methyl, Pr$^i$ = isopropyl, Ph = phenyl

TABLE
Examples 3 and 4, preparation and properties of polarizing film

| Example | Stretch ratio ε % | $Q_E \geq 10$ in the wavelength range nm | $Q_E$ max | $P \geq 95\%$ in the wavelength range | $P_{max}$ % |
|---|---|---|---|---|---|
| 3 | 764 | 440–740 | 31.3 at 600 nm | 530–640 | 97.9 |
| 4 | 746 | 690–>800 | 27.1 at 800 nm | 400–800 | 99.9 |
| 4* | 746 | <400–>800 | 35.7 at 780 nm | <400–>800 | 100 |

*Subsequent measurement with the aid of the spectrophotometer PM Q II supplied by Zeiss

What is claimed is:

1. A highly effective polarizer having a stretch ratio ε of more than 300%, which is made from a polyacetylene-containing polymer product having a matrix of pure polyvinylalcohol (PVS) with a degree of saponification of 90–100% and with a maximum degree of polarization P of at least 95% and a dichoric ratio $Q_E$ over almost the entire wavelength range of visible light, from 400 to 800 nm, of $Q_E$ = quotient of the extinction in the blocked position to the extinction in the transmission position = 10 or greater in the form of a stretched film.

2. The plarizer of claim 1 with a stretch ratio ε of at least 500%.

3. The polarizer of claim 2 with a stretch ratio ε of cat least 600%.

4. The polarizer of claim 1 with a maximum degree of polarization P of at least 98% and a maximum $Q_E$ value of 15 and above.

5. The polarizer of cliam 4 with a maximum degree of polarization P of at least 99%.

6. The polarizer of claim 5 with a maximum degree of polarization P of at least 99.5%.

7. The polarizer of claim 4 with a maximum $Q_E$ value of 20 and above.

8. The polarizer of claim 7 with a maximum $Q_E$ value of 30 and above.

9. The polarizer of claim 8 with a maximum $Q_E$ value of 40 and above.

10. A highly effective polarier having a stretch ratio ε of more than 300%, which can be prepared by polymerizing acetylene at 20°–120° C. for a period of 5–1,000 sec. in the solution of a pure polyvinyl alcohol (PVS) with a degree of saponification of 90–100% in a cyclic, N-alkylsubstituted lactam or a cyclic N,N'-dialkylsubstituted urea as solvent in the presencde of $10^{-1}$ to $10^{-5}$ moles of a nickel catalyst per liter of polymerization ingredients, the nickel catalyst being obtained by reacting a nickel (O) compound or a compound which can be converted in situ into a nickel (O) compound with phosphorous compounds of the formulae

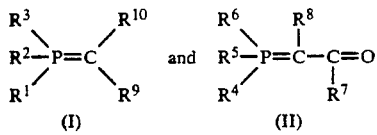

in which
- $R^1$, $R^2$ and $R^3$ independently of one another denote $C_1-C_{20}$-alkyl, $C_1-C_{20}$-alkoxy, $C_3-C_8$-cycloalkyl, $C_2-C_{20}$-alkenyl, di-$C_1-C_4$-alkylamino, $C_6-C_{12}$-aryl, $C_6-C_{12}$-aryloxy or $C_7-C_{15}$-aralkyl,
- denotes $C_6-C_{12}$-aryl,
- $R^5$, $R^6$, $R^7$ and $R^8$ independently of one represent $C_1-C_{20}$-alkyl, $C_1-C_{20}$-alkoxy, $C_2-C_{20}$-alkenyl, $C_3-C_8$-cycloalkyl, $C_6-C_{12}$-aryl or $C_6-C_{12}$-aryloxy and additionally
- $R^7$ can denote hydrogen,
- $R^8$ can denote hydrogen or acyl and
- $R^9$ and $R^{10}$ independently of one another can denote hydrogen, silyl, acyl, nitrophenyl, cyano or $R^1$, or in the presence of nickel catalysts which can be prepared by reacting a nickel(O) compound or a compound which can be converted in situ into a nickel(O) compound with an adduct or a mixture of a quinonoid compound and a phosphine of the formula

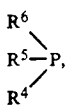 (III)

in which $R^4$, $R^5$ and $R^6$ have the above meaning,
and of a compound of the formula (I), processing the polymer into a film and stretching the said film.

11. The polarizer of claim 10, wherein the polymerization is carried out in the presence of a nickel catalyst which is obtained by reacting a nickel(O) compound with phosphorus compounds of the formula

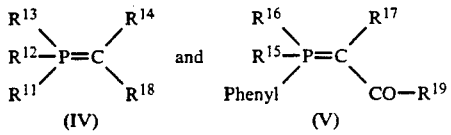

in which

- $R^{11}$, $R^{12}$ and $R^{13}$ independently of one another denote $C_1-C_8$-alkyl, phenyl or benzyl,
- $R^{14}$ represents hydrogen, $C_1-C_8$-alkyl or phenyl,
- $R^{15}$, $R^{16}$ and $R^{17}$ independently of one another denote $C_1-C_8$-alkyl or phenyl, and $R^{17}$ may additionally denote hydrogen or acyl,
- $R^{18}$ denotes hydrogen or phenyl and
- $R^{19}$ represents phenyl or $C_1-C_4$-alkyl, or to the use of nickel catalysts which can be prepared by reacting a nickel(O) compound or a compound which can be converted in situ into a nickel(O) compound with an adduct or a mixture of benzoquinone and a phosphine of the formula

 (VI)

in which $R^{15}$ and $R^{16}$ have the above meaning, and of a compound of the formula (IV).

12. The polarizer of cliam 11, wherein the polymeization is carried out in the presence of an ickel catalyst which is obtained by reacting a nickel(O) compound with phosphorus compounds of the formulae

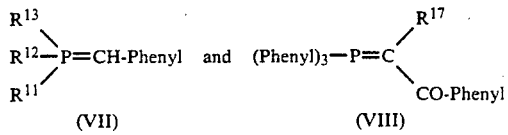

are used, in which
- $R^{11}$, $R^{12}$, $R^{13}$ and $R^{17}$ have the meaning given in claim 5, or in the presence of nickel catalysts which can be prepared by reacting a nickel(O) compound or a compound which can be converted in situ into a nickel(O) compound with an adduct or a mixture of benzoquinone and triphenylphosphine and of a compound of the formula (VII).

13. The polarizer of claim 10 having a stretch ratio of at least 500%.

14. The polarizer of claim 13 having a stretch ratio ϵ of at least 600%.

15. The polarizer of claim 10 for which the polymerization is carried out for a period of 5 to 600 seconds.

16. The polarizer of claim 10 having adhesive layers applied on one or both sides, which can bear outer layers.

* * * * *

UNITED STATES PATENT AND TRADEMARK OFFICE
CERTIFICATE OF CORRECTION

PATENT NO. : 5,073,014

DATED : December 17, 1991

INVENTOR(S) : Karl-Heinz A. Ostoja-Starzewski

It is certified that error appears in the above-identified patent and that said Letters Patent is hereby corrected as shown below:

Col. 10, line 31   Delete " (PVS) " and substitute -- (PVA) --

Col. 10, line 33   Delete " dichoric " and substitute -- dichroic --

Col. 10, line 38   Delete " plarizer " and substitute -- polarizer --

Col. 10, line 40   Delete " cat " and substitute -- at --

Col. 10, line 45   Delete " cliam " and substitute -- claim --

Col. 10, line 56   Delete " polarier " and substitute -- polarizer --

Col. 10, line 60   Delete " (PVS) " and substitute -- (PVA) --

Col. 10, line 62   Delete " presencde " and substitute -- presence --

Col. 11, line 14   Before " denotes " insert -- $R^4$ --

Col. 11, line 15   After " one " insert -- another --

Col. 11, line 42   Delete " formula " and substitute -- formulae --

UNITED STATES PATENT AND TRADEMARK OFFICE
CERTIFICATE OF CORRECTION

PATENT NO. : 5,073,014
DATED : December 17, 1991
INVENTOR(S) : Karl-Heinz A. Ostoja-Starzewski It is certified that error appears in the above-indentified patent and that said Letters Patent is hereby corrected as shown below:

Col. 12, lines 22-23   Delete "polymeization" and substitute -- polymerization --, delete "ickel" and substitute -- nickel --.

Signed and Sealed this

Nineteenth Day of October, 1993

Attest:

BRUCE LEHMAN

Attesting Officer    Commissioner of Patents and Trademarks